US009622033B2

(12) United States Patent
Goss et al.

(10) Patent No.: US 9,622,033 B2
(45) Date of Patent: Apr. 11, 2017

(54) NAVIGATION SYSTEM WITH LOCATION DETECTION MECHANISM AND METHOD OF OPERATION THEREOF

(71) Applicant: Telenav, Inc., Sunnyvale, CA (US)

(72) Inventors: Lowell Goss, Sunnyvale, CA (US); Melanie Araujo, San Francisco, CA (US); Wes Luo, Los Altos, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 14/859,744

(22) Filed: Sep. 21, 2015

(65) Prior Publication Data

US 2016/0088436 A1  Mar. 24, 2016

Related U.S. Application Data

(60) Provisional application No. 62/053,190, filed on Sep. 21, 2014.

(51) Int. Cl.
*H04W 4/02* (2009.01)
*G01C 21/36* (2006.01)

(52) U.S. Cl.
CPC ........ *H04W 4/021* (2013.01); *G01C 21/3682* (2013.01)

(58) Field of Classification Search
CPC .. H04W 4/021; H04W 12/02; G01C 21/3682; H04L 63/0421
See application file for complete search history.

(56) References Cited

U.S. PATENT DOCUMENTS

2011/0201351 A1   8/2011   Chen
2012/0008526 A1*  1/2012   Borghei .................. H04W 4/08
                                                    370/254
2014/0155094 A1   6/2014   Zises

* cited by examiner

*Primary Examiner* — Yuen Wong
(74) *Attorney, Agent, or Firm* — IP Investment Law Group (57) ABSTRACT

A method of operation of a navigation system includes: determining a multiple instances of a user location within a geofence; generating an event with a control unit based on a user count of the user location meeting or exceeding a count threshold; and generating a notification based on the event for displaying on a device.

17 Claims, 6 Drawing Sheets

NAVIGATION SYSTEM WITH LOCATION DETECTION MECHANISM AND METHOD OF OPERATION THEREOF

CROSS-REFERENCE TO RELATED APPLICATION(S)

This application claims the benefit of U.S. Provisional Patent Application Ser. No. 62/053,190 filed Sep. 21, 2014, and the subject matter thereof is incorporated herein by reference thereto.

TECHNICAL FIELD

The present invention relates generally to a navigation system, and more particularly to a system with location detection mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without location detection mechanism has become a paramount concern for the consumer. The inability decreases the benefit of using the tool.

Thus, a need still remains for a navigation system with location detection mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a multiple instances of a user location within a geofence; generating an event with a control unit based on a user count of the user location meeting or exceeding a count threshold; and generating a notification based on the event for displaying on a device.

The present invention provides a navigation system, including: a control unit for: determining a multiple instances of a user location within a geofence, generating an event based on a user count of the user location meeting or exceeding a count threshold, generating a notification based on the event, and a communication interface, coupled to the control unit, for communicating the notification for displaying on a device.

The present invention provides a navigation system including a non-transitory computer readable medium including instructions for execution, the instructions comprising: determining a multiple instances of a user location within a geofence; generating an event based on a user count of the user location meeting or exceeding a count threshold; and generating a notification based on the event for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
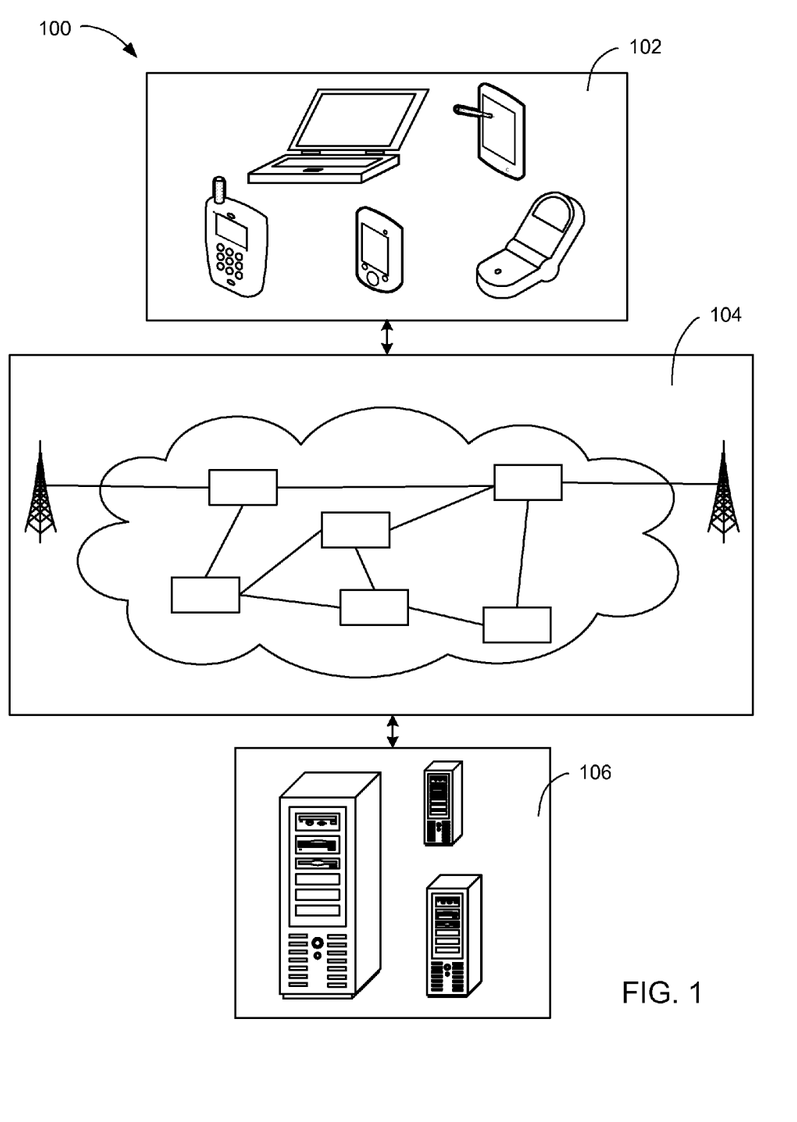
FIG. 1 is a navigation system with location detection mechanism in an embodiment of the present invention.

Referring now to FIG. 1, therein is shown a navigation system 100 with location detection mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
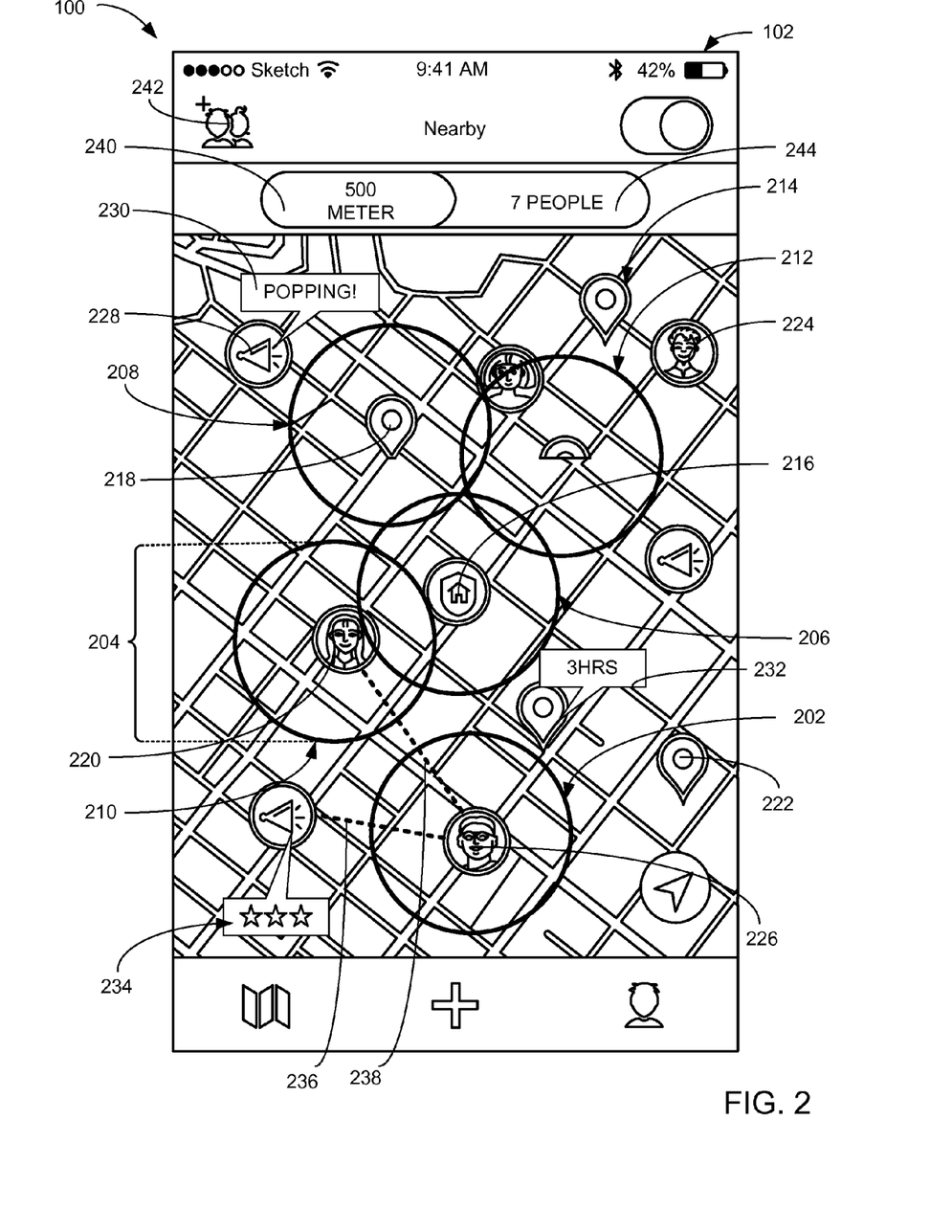
FIG. 2 is an example of information displayed by the navigation system.

Referring now to FIG. 2, therein is shown a first example of information displayed by the navigation system 100. For clarity and brevity, the discussion of an embodiment of the present invention will focus on the first device 102 displaying the result generated by the navigation system 100. However, the second device 102 of FIG. 1 and the first device 102 can be discussed interchangeably.

A geofence 202 is defined as a boundary. For example, the geofence 202 can represent a digital representation of the boundary within a geographic area. For further example, the geofence 202 can include a fence dimension 204.

The fence dimension 204 is defined as a spatial attribute of the geofence 202. For example, the fence dimension 204 of the geofence 202 can include a polygon, a circle, an amorphous shape, or a combination thereof.

The geofence 202 can include a home geofence 206, a point of interest (POI) geofence 208, a user geofence 210, a future geofence 212, or a combination thereof. The navigation system 100 can generate different types of the geofence 202 based on a location type 214, which is defined as a categorization of a physical location.

For example, the location type 214 can include a home location 216, a POI location 218, a user location 220, an event location 222, or a combination thereof. The location type 214 can be represented as a digital representation of a physical location. More specifically as an example, the location type 214 can be represented in longitude and latitude information.

The home geofence 206 is defined as the geofence 202 surrounding the home location 216. The home location 216 is defined as a physical location where the user designate as the home address. The POI geofence 208 is defined as the geofence 202 surrounding the POI location 218. The POI location 218 is defined as a physical location where of a point of interest. For example, the home location 216 and the POI location 218 can represent two different or same locations.

The user geofence 210 is defined as the geofence 202 surrounding the user location 220. The user location 220 is defined as a physical location representing where the user of the navigation system 100 is at. For example, the user location 220 can include a personal location 224, an other's location 226, or a combination thereof. The personal location 224 is defined as a physical location of where a user of the first device 102 is at. The other's location 226 is defined as a physical location of where a different user of the first device 102 is at. More specifically as an example, the user and the other user can represent two different users using the navigation system 100.

The future geofence 212 is defined as the geofence 202 generated in a future timeframe. The future timeframe can be represented in second, minute, hour, day, week, month, year, season, or a combination thereof. For example, the navigation system 100 can generate the future geofence 212 on a specific time and location in the future.

An event 228 is defined as an occasion where multiple people are gathered. For example, the event 228 can occur where there more than one users at a specific physical location. The event 228 can represent temporary meet-ups, hangouts, hops, or a combination thereof. The event can also represent permanent, persistent, repetitive, or a combination thereof occasion. An event location 222 is defined as a physical location where the event 228 is happening or happened.

The event 228 can include an event status 230, an event duration 232, an event popularity 234, or a combination thereof. The event status 230 is defined as a condition of the event 228. For example, the event status 230 can be represented as "just started," "on going," or "ended." The event duration 232 is defined as a length in time of the event 228. For example, the event duration 232 can be represented in the timeframe of second, minute, hour, day, week, month, year, season, or a combination thereof.

A travel distance 236 is defined as a physical distance traveled. For example, the travel distance 236 can represent the physical distance traveled by the user from one location to another location. A user distance 238 is defined as a physical distance between two different users. For example, the user distance 238 can represent the physical distance between the personal location 224 and the other's location 226.

A distance threshold 240 is defined as a limit on the physical distance. For example, the distance threshold 240 can represent a minimum or maximum instance of the travel distance 236. For another example, the distance threshold 240 can represent a minimum or maximum instance of the user distance 238 between two users.

A user count 242 is a number of users. For example the user count 242 represent at least 0. For further example, the user count 242 can represent the number of users within the geofence 202, the event 228, or a combination thereof. A count threshold 244 is a limit on the user count 242. For example, the count threshold 244 can represent a minimum or maximum limit for the user count 242.

Figure 3:
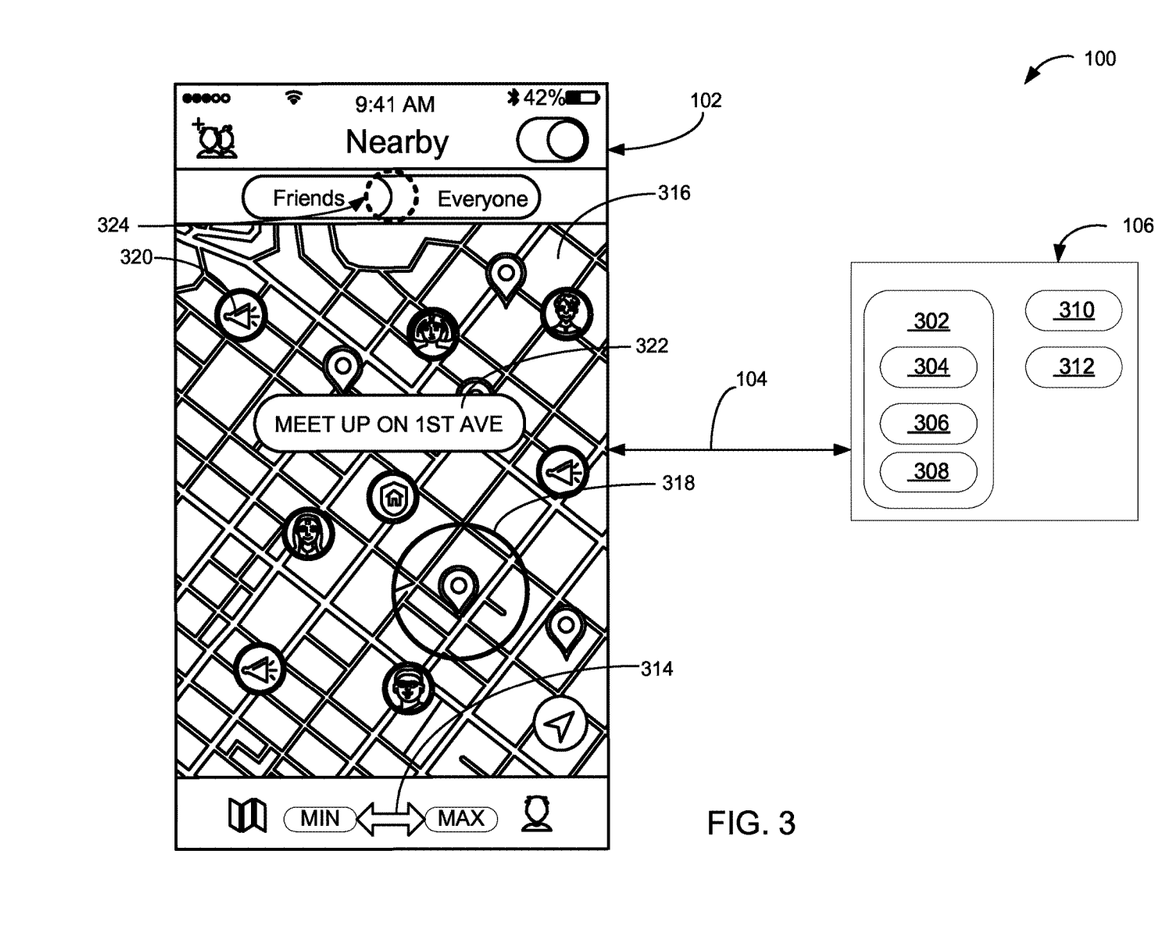
FIG. 3 is an example of interaction between the first device and the second device via the communication path.

Referring now to FIG. 3, therein is shown an example interaction between the first device 102 and the second device 106 via the communication path 104. A user profile 302 is defined as information about the user of the navigation system 100. For example, the user profile 302 can include an activity history 304, a user activity 306, a relationship level 308, or a combination thereof.

The activity history 304 is defined as a log of an activity performed. For example, the activity history 304 can represent the record of the user activity 306 engaged by the user on the first device 102. The user activity 306 is defined as action being performed or performed. For example, the user, the other user, or a combination thereof can perform the user activity 306.

The relationship level 308 is defined as a degree of affinity between multiple users. For example, the relationship level 308 can represent "family" if the user is father of the other user. A relationship threshold 310 is defined as required degree of relationship. For example, the relationship threshold 310 can represent the user and the other user having the relationship level 308 of at least "friend" in order for multiple users engage in the user activity 306.

For a different example, the relationship threshold 310 can represent the user and the other user having the relationship level 308 of at most "colleague" in order for multiple users share the user location 220 of FIG. 2. The relationship level 308 can be established based on a connection within a social network site, such as Facebook™, LinkedIn™, Twitter™, or a combination thereof.

The relationship level 308 can change based on whether the connection establishes a one directional follow, a bidirectional follow, or a combination thereof. More specifically as an example, the one directional follow can represent the relationship level 308 where one user can have multiple users that are followers of that one user. For a different example, the bidirectional follow can represent the user and the other user follow each other by establishing a relationship with each via, for example, social network site, the navigation system 100, or a combination thereof.

An exposure level 312 is the degree of disclosing a location. For example, the exposure level 312 can determine whether to expose the location type 214 of FIG. 2. For further example, the exposure level 312 can change based on a zoom level 314. The zoom level 314 is defined as a functionality to enlarge or reduce the size of a content 316. For example, the user can change the zoom level 314 by enlarging the content 316 on the first device 102 to improve viewing capability. For a different example, the user can change the zoom level 314 to reduce the size of the content 316 displayed by the first device 102.

The navigation system 100 can display the user location 220 of FIG. 2 on a map, but limiting the zoom level 314 to control the other user from locating the precise location of the user location 220. For example, by controlling the exposure level 312, the navigation system 100 does not allow others to see the precise location (e.g. within 0.5 mile) on the map when you are at the home location 216 of FIG. 2. For each instances of the point of interest, the navigation system 100 can display the user profile 302 of other users who have previously been to location type 214.

A protection radius 318 is defined as a boundary to limit the exposure level 312 of the user location 220. As discussed above for example, the protection radius 318 can block the other user from viewing the user location 220 or the personal location 224 of FIG. 2 within a specified area. For example, the navigation system 100 can set the protection radius 318 based on the geofence 202. For another example, the navigation system 100 can set the protection radius 318 having a different size as the geofence 202. More specifically as an example, the protection radius 318 can be bigger or smaller than the geofence 202. For further example, the protection radius 318 can be within the geofence 202 or the geofence 202 can be within the protection radius 318.

When a home protection functionality for the navigation system 100 is active, the precise location of the personal location 224 can be obscured or hidden from being displayed on the first device 102 of the other user. Instead, the other user will see the protection radius 318 the personal location 224 of the user. The precise location of the personal location 224 is within the protection radius 318.

The protection radius 318 can be applied to other situation of the user location 220. For example, the protection radius 318 can be applied when the personal location 224 is outside of the home geofence 206 of FIG. 2. More specifically as an example, the protection radius 318 can be applied when the user is within the POI geofence 208 to hide the user's precise location from stranger.

The content 316 is defined as information displayed on a device. The content 316 can include a notification 320, a suggestion 322, or a combination thereof. The notification 320 is an announcement to inform the user. The suggestion 322 is defined as a recommendation. For example, the suggestion 322 can be included in the notification 320 to inform the user of the first device 102. The content 316 can also include a map of the geographic area where the geofence 202 of FIG. 2, the location type 214, or a combination thereof are established, located, or a combination thereof.

A user entry 324 is an input. For example, the user can make the user entry 324 to make an input to the first device 102, the navigation system 100, or a combination thereof. For example, the user entry 324 can represent manual input, oral command, gesture, or a combination thereof.

For further example, the user entry 324 can give control to user for participation and protecting their location. More specifically as an example, by giving control, the navigation system 100 can deliver the balance between location sharing protection for oneself and viewing others location. The user entry 324 can be made by sliding a sliding-on button to permit location sharing, to participate in the service provided by the present invention, to view the other's location 226 of FIG. 2, or a combination thereof. The user can make the user entry 324 to slide-off and protect the user location 220 from being able to view by the other user.

For further example, the navigation system 100 can provide slide protection to turn-off location display. Additionally, the navigation system 100 can display the event 228 on a map displayed on the first device 102 for other users to join, share comment or digital photo/video, invite others, or a combination thereof. For a specific example, the other user can make the user entry 324 to join the event 228 hosted by the user based on the relationship level 308 between the user and the other user.

Figure 4:
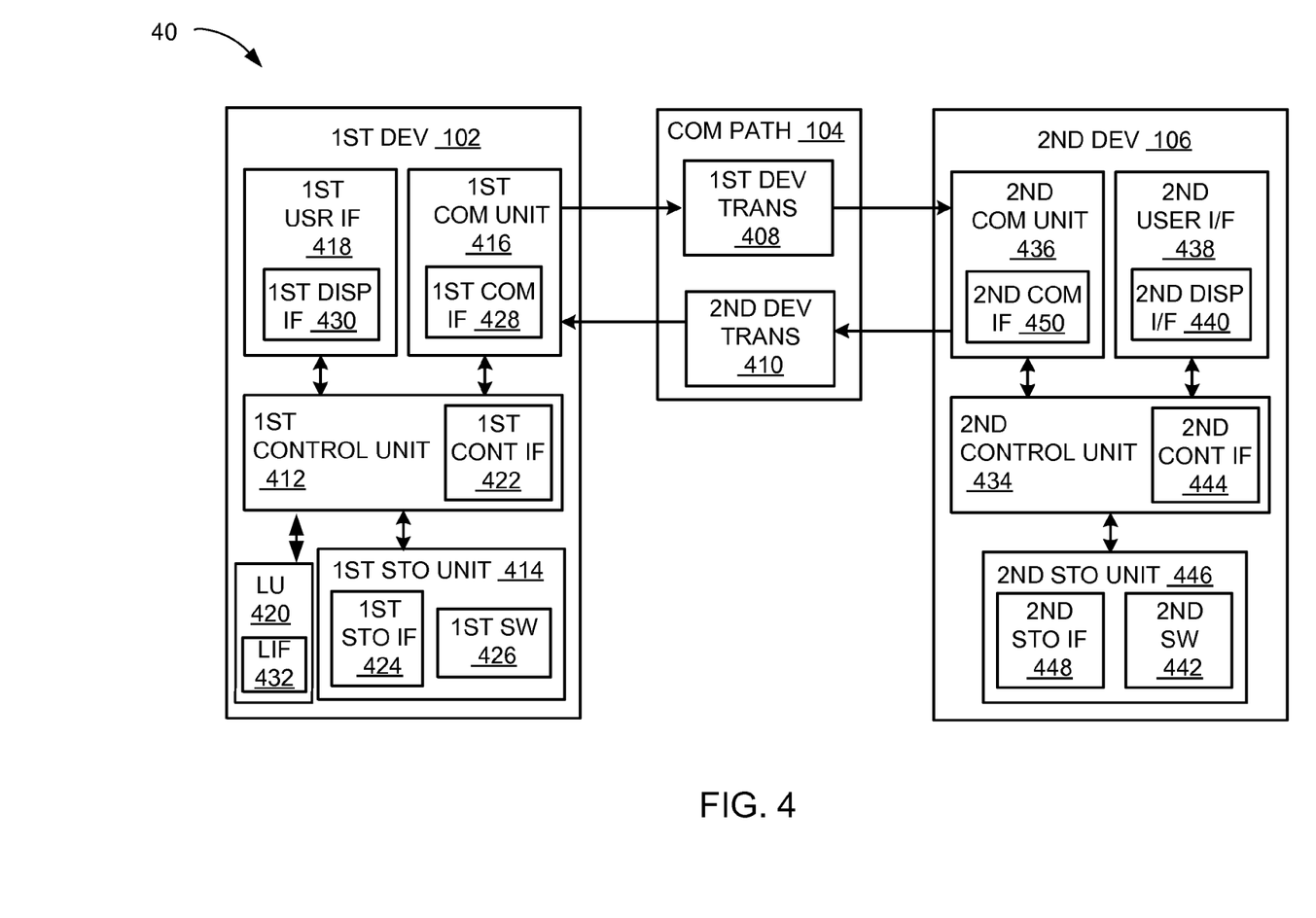
FIG. 4 is an exemplary block diagram of the navigation system.

Referring now to FIG. 4, therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations physically separate from the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate location information, current heading, and current speed of the first device 102, as examples. The location unit 420 can be implemented in many ways. For example, the location unit 420 can function as at least a part of a global positioning system (GPS), an inertial navigation system, a cellular-tower location system, a pressure location system, or any combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations physically separate from the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, points of interest (POI), navigation routing entries, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the location unit 420 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations physically separate from the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows a user (not shown) to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations physically separate from the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations physically separate from the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
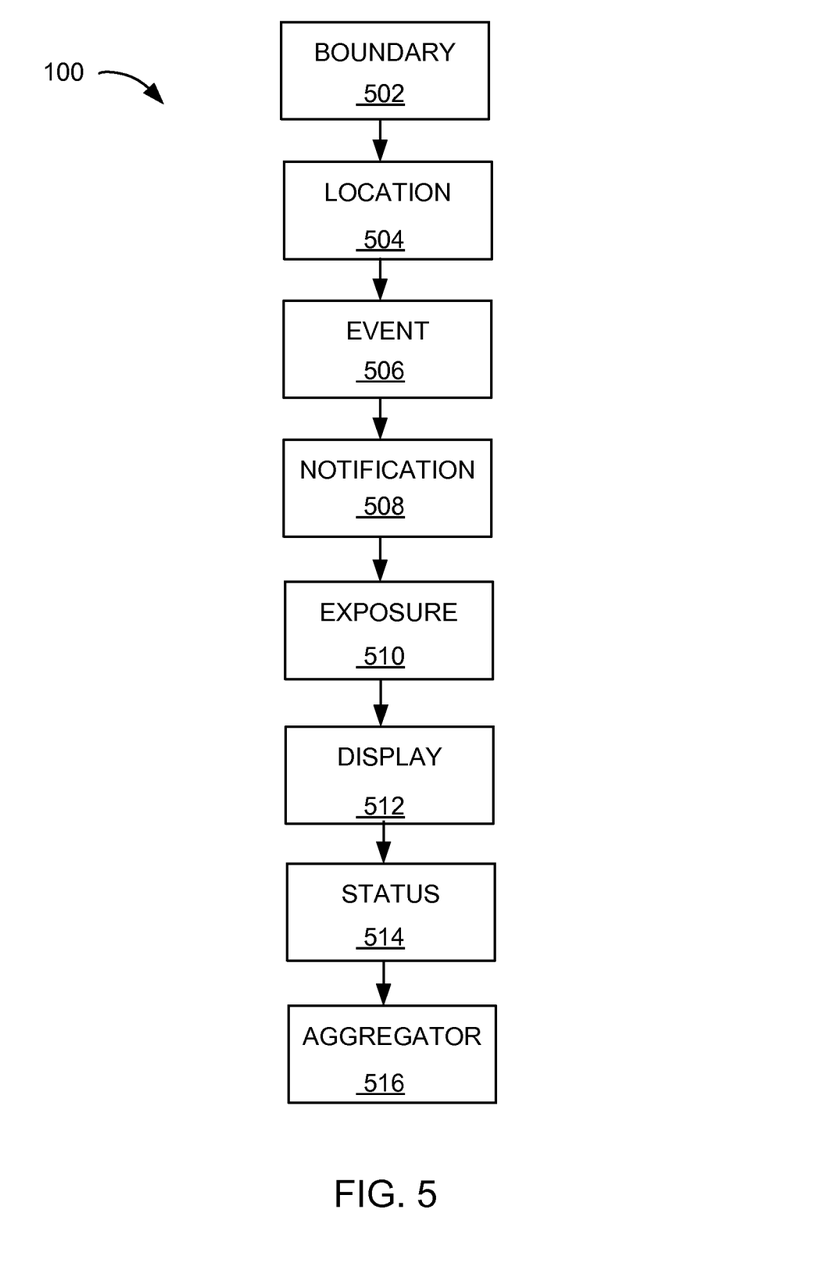
FIG. 5 is a control flow of the navigation system.

Referring now to FIG. 5, therein is shown a control flow of the navigation system 100. The navigation system 100 can include a boundary module 502. The boundary module 502 generates the geofence 202 of FIG. 2. For example, the boundary module 502 can generate the geofence 202 including the home geofence 206 of FIG. 2, the point of interest (POI) geofence 202 of FIG. 2, or a combination thereof.

The boundary module 502 can generate the geofence 202 in a number of ways. For example, the boundary module 502 can generate the geofence 202 with the fence dimension 204 of FIG. 2. The fence dimension 204 can represent a polygon, a circle, an amorphous shape, or a combination thereof. For further example, the boundary module 502 can generate the geofence 202 based on the diameter of the geofence 202, the length of the periphery of the geofence 202, or a combination thereof.

For another example, the boundary module 502 can generate multiple instances of the geofence 202. One instance of the geofence 202 can overlap another instance of the geofence 202. More specifically as an example, the fence dimension 204 can represent a circle. The fence dimension 204 of the geofence 202 can represent a donut or ring having the circle at the center.

For a different example, the boundary module 502 can generate the geofence 202 based on the location type 214 of FIG. 2. More specifically as an example, the boundary module 502 can generate the home geofence 206 based on the home location 216 of FIG. 2. The home location 216 can represent the user's home address. Based on the home location 216, the boundary module 502 can generate the home geofence 206 surrounding the home location 216. For further example, the home location 216 can be at the center of the home geofence 206 or within the home geofence 206 but not at the center.

For another example, the boundary module 502 can generate the POI geofence 208 based on the POI location 218 of FIG. 2. The POI location 218 can represent the address of the POI. Based on the POI location 218, the boundary module 502 can generate the POI geofence 208 surrounding the POI location 218. For further example, the POI location 218 can be at the center of the POI geofence 208 or within the POI geofence 208 but not at the center. The boundary module 502 can communicate the geofence 202 to a location module 504.

The navigation system 100 can include the location module 504, which can couple to the boundary module 502. The location module 504 determines the user location 220 of FIG. 2. For example, the location module 504 can determine the user location 220 including the personal location 224 of FIG. 2, the other's location 226 of FIG. 2, or a combination thereof.

The location module 504 can determine the user location 220 in a number of ways. For example, the location module 504 can determine the user location 220 with the location unit 420 of FIG. 4 of the first device 102 of FIG. 1. More specifically as an example, the location module 504 can determine the personal location 224 to identify the physical location of the user of the first device 102.

For a different example, the location module 504 can determine the other's location 226 based on the location unit 420 of the first device 102 operated by the other user. For further example, the location module 504 can determine the other's location 226 based on the relationship level 308 of FIG. 3 with the user. More specifically as an example, if the relationship level 308 of the user and the other user represents "stranger," then the location module 504 may not be able to determine the other's location 226. In contrast, if the relationship level 308 of the user and the other user represents "family," then the location module 504 can determine the other's location 226.

For further example, the location module 504 can determine the personal location 224, the other's location 226, or a combination thereof within the geofence 202. More specifically as an example, the location module 504 can determine the personal location 224 whether the personal location 224 is outside of the home geofence 206 or within the POI geofence 208. In contrast, the location module 504 can hide the personal location 224 if the personal location 224 is within the home geofence 206 to protect the privacy of the user.

For another example, the location module 504 can determine the personal location 224, the other's location 226, or a combination thereof based on the relationship level 308. If the relationship level 308 between the user and the other user represents "family," the location module 504 can determine the personal location 224 for other users to see even if the user is within the home geofence 206. In contrast, if the relationship level 308 between the user and the other user is less than the relationship level 308 of "family," the location module 504 on the first device 102 operated by the other user can stop determining the personal location 224 in the home geofence 206 to protect the privacy of the user.

Furthermore, the relationship level 308 can range from stranger to significant other. More specifically as an example, the range for the relationship level 308 can be represented in alphanumeric value to illustrate the various instances of the relationship level 308. For example, the relationship level 308 can also include acquaintance, distant relative, friend, husband and wife, ex-significant other, or a combination thereof.

The user can be denoted as the first user and the other user can be denoted as the second user. However, the notation of first and second does not represent ordinal priority. But rather, the notation is used for convenience to illustrate multiple users operating the navigation system 100. The location module 504 can communicate the user location 220 to the boundary module 502, an event module 506, or a combination thereof.

For illustrative purposes, the navigation system 100 is described with the boundary module 502 generating the home geofence 206, the POI geofence 208, or a combination thereof, although it is understood that the boundary module 502 can operate differently. For example, the boundary module 502 can generate the user geofence 210 of FIG. 2 based on the user location 220.

The boundary module 502 can generate the user geofence 210 in a number of ways. For example, the boundary module 502 can generate the user geofence 210 based on the user location 220. The user location 220 can represent the physical location detected by, for example, the location unit 420 of the first device 102. Based on the user location 220, the boundary module 502 can generate the user geofence 210 surrounding the user location 220. For further example, the user location 220 can be at the center of the user geofence 210 or within the user geofence 210 but not at the center.

For another example, the boundary module 502 can generate the user geofence 210 based on the activity history 304 of FIG. 3, the travel distance 236 of FIG. 2, the user profile 302 of FIG. 3, or a combination thereof. More specifically as an example, the activity history 304 can indicate that the user is traveling from San Francisco, Calif. to New York City, N.Y. The activity history 304 can also indicate that the user resides in San Francisco. The location unit 420 can calculate the travel distance 236 based on the physical distance between San Francisco and New York City. If the travel distance 236 meets or exceeds the distance threshold 240 of FIG. 2, the boundary module 502 can generate the user geofence 210 based on the user location 220 outside of the user's residential area.

For a different example, the boundary module 502 can predict and generate the future geofence 212 of FIG. 2 based on the activity history 304, the user activity 306 of FIG. 3, or a combination thereof. More specifically as an example, the user activity 306 can indicate the user posting on a social network site indicating that the user will travel to New York City on a specific date. As stated above, the user's residence area can represent San Francisco. Since the travel distance 236 can meet or exceed the distance threshold 240, the boundary module 502 can predict and generate the future geofence 212 on a specific date on a specific location.

The navigation system 100 can include the event module 506, which can couple to the location module 504. The event module 506 generates the event 228 of FIG. 2. For example, the event module 506 can generate the event 228 based on the user location 220, the user distance 238 of FIG. 2, the distance threshold 240, or a combination thereof.

The event module 506 can generate the event 228 in a number of ways. For example, the event 228 can also be called the hop, the hangout, or a combination thereof. The event 228 can represent a situation where more than one person is within the physical proximity. More specifically as an example, the event module 506 can generate the event 228 based on comparing the user distance 238 and the distance threshold 240 for determining the physical proximity.

For a specific example, the event module 506 can generate the event 228 based on the user distance 238 between the personal location 224 and the other's location 226 is below the distance threshold 240. As a result, the event module 506 can determine the personal location 224, the other's location 226, or a combination thereof as the event location 222 of FIG. 2 for the event 228.

For another example, the event module 506 can generate the event 228 based on the user location 220 within the geofence 202. More specifically as an example, the event module 506 can generate the event 228 based on the personal location 224, the other's location 226, or a combination thereof is within the home geofence 206, the POI geofence 208, the user geofence 210, or a combination thereof.

For further example, the event module 506 can generate the event 228 based on the user count 242 of FIG. 2 meeting or exceeding the count threshold 244 of FIG. 2. More specifically as an example, the user count 242 within the geofence 202 can represent two. The count threshold 244 can represent five. If the user count 242 is increased from two to five or more, the event module 506 can generate the event 228.

It has been discovered that the navigation system 100 generating the event 228 based on the user count 242 meeting or exceeding the count threshold 244 improves the accuracy of determining whether the event 228 is happening or not. By limiting the generation of the event 228 based on the user count 242 meeting or exceeding the count threshold 244, the navigation system 100 can control and trigger the dynamic generation of the event 228 at the geographic area at a specific timeframe. As a result, the navigation system 100 can notify the user, the other user, or a combination thereof more efficiently and accurately if the event 228 is occurring or not.

For another example, the event module 506 can generate the event 228 based on the relationship level 308 meeting or exceeding the relationship threshold 310 of FIG. 3. More specifically as an example, the relationship threshold 310 can represent "alumni." If the user count 242 for the relationship level 308 with the same alumni status is zero, the event module 506 will not generate the event 228. In contrast, if there is one other person with the relationship level 308 that meets or exceeds the relationship threshold 310, the event module 506 can generate the event 228.

It has been discovered that the navigation system 100 generating the event 228 based on the relationship level 308 meeting or exceeding the relationship threshold 310 improves the accuracy of determining whether the event 228 should be created or not. By limiting the generation of the event 228 based on the relationship level 308 meeting or exceeding the relationship threshold 310, the navigation system 100 can control and trigger the dynamic generation of the event 228 at the geographic area at a specific timeframe. As a result, the navigation system 100 can notify the user, the other user, or a combination thereof more efficiently and accurately if the event 228 is occurring or not.

The event module 506 can determine the event duration 232 of FIG. 2 based on calculating from the start time to the end time of the event 228. More specifically as an example, the event module 506 can start the calculation of the event duration 232 based on the condition to generate the event 228 has been met as discussed above. And the event module 506 can end the calculation of the event duration 232 based the user count 242, the relationship level 308, or a combination thereof.

For a specific example, the event module 506 can determine the end of the event duration 232 or the event 228 based on the user count 242 below the count threshold 244. For a different example, the event module 506 can end the event 228 based on the relationship level 308 between the user and the other user is below the relationship threshold 310 even if the user count 242 can meet or exceed the count threshold 244. More specifically as an example, the event module 506 can delete the event 228. As a result, the event 228 can disappear from being displayed, for example on the map, on the first device 102.

It has been discovered that the navigation system 100 ending the event 228 based on the user count 242 below the count threshold 244, the relationship level 308 between the user and the other user is below the relationship threshold 310, or a combination thereof improves the accuracy of determining whether the event 228 exists or not. By limiting the ending of the event 228 based on the user count 242 below the count threshold 244, the relationship level 308 between the user and the other user is below the relationship threshold 310, or a combination thereof, the navigation system 100 can control and trigger the dynamic ending of the event 228 at the geographic area at a specific timeframe. As a result, the navigation system 100 can notify the user, the other user, or a combination thereof more efficiently and accurately if the event 228 is occurring or not.

The event module 506 can determine the event popularity 234 of FIG. 2. More specifically as an example, the event module 506 can determine the event popularity 234 based on the user count 242 meeting or exceeding the count threshold 244 within the geofence 202. The event popularity 234 can represent "high" or "popping" if the user count 242 exceeds the count threshold 244. For further example, the event module 506 can determine the event popularity 234 based on the relationship level 308 meeting or exceeding the relationship threshold 310. Even if the user count 242 meets or exceeds the count threshold 244, the event module 506 can determine the event popularity 234 to represent "high" only if the other user with the relationship level 308 meeting or exceeding the relationship threshold 310 is at the event 228. The event module 506 can communicate the event 228 to a notification module 508.

The navigation system 100 can include the notification module 508, which can couple to the event module 506. The notification module 508 generates the notification 320 of FIG. 3. For example, the notification module 508 can generate the notification 320 based on the user location 220 within the geofence 202 for delivering the notification 320 regarding the event 228.

The notification module 508 can generate the notification 320 in a number of ways. For example, the notification module 508 can generate the notification 320 based on the personal location 224, the other's location 226, or a combination thereof within the home geofence 206, the POI geofence 208, the user geofence 210, or a combination thereof.

For a different example, if the user distance 238 is within the distance threshold 240, the notification module 508 can generate the notification 320 to notify the event 228. More specifically as an example, the user distance 238 between the other's location 226 and the POI location 218 is under the distance threshold 240. As a result, the notification module 508 can generate the notification 320 for displaying on the first device 102 of the other user.

For another example, the notification module 508 can generate the notification 320 based on the relationship level 308. As an example, the notification module 508 can generate the notification 320 for delivering to all users if the relationship level 308 for delivering the notification 320 is set to "everyone." For another example, the notification module 508 can generate the notification 320 for delivering to some users based on the relationship level 308 amongst the participants at the event 228. The notification module 508 can control the generation and the delivery of the notification 320 based on the relationship level 308.

For a different example, the notification module 508 can generate the notification 320 based on the event popularity 234. More specifically as an example, if the event popularity 234 is 1 based on a range from 0 to 4 with 0 representing no popularity and 10 representing high popularity, the notification module 508 may not be triggered to generate the notification 320. In contrast, if the event popularity 234 is 9, the notification module 508 can generate the notification 320 for delivering to the first device 102 of the users.

For another example, the notification module 508 can generate the notification 320 based on the future geofence 212. More specifically as an example, the future geofence 212 can be generated for a specific date and location in the future. The notification module 508 can generate the notification 320 indicating the event 228 will be held at the specific location on the specific date within the future geofence 212.

For further example, the notification module 508 can generate the suggestion 322 of FIG. 3 based on the event popularity 234, the user location 220, the relationship level 308. The suggestion 322 can represent an invitation for the users who should attend the event 228. For example, the user or the other user can be outside of the geofence 202. The event popularity 234 can indicate that the event 228 is popular. And the relationship level 308 exceeds the relationship threshold 310 at the event 228. As a result, the notification module 508 can generate the suggestion 322 to invite the user, the other user, or a combination thereof to attend the event 228. The notification module 508 can communicate the notification 320 to an exposure module 510.

The navigation system 100 can include the exposure module 510, which can couple to the notification module 508. The exposure module 510 determines the exposure level 312 of FIG. 3. For example, the exposure module 510 can determine the exposure level 312 based on the user location 220, the zoom level 314 of FIG. 3, the geofence 202, the relationship level 308, or a combination thereof.

The exposure module 510 can determine the exposure level 312 in a number of ways. For example, the exposure module 510 can determine the exposure level 312 based on the user location 220 relative to the geofence 202. More specifically as an example, the exposure level 312 can range from "no exposure" to "complete exposure" to expose or not expose the user location 220 on the map by displaying or not displaying the user location 220 on a multiple instances of the first device 102 of the user, the other user, or a combination thereof.

For a specific example, the exposure module 510 can determine the exposure level 312 to represent "no exposure" once the personal location 224 is detected within the home geofence 206 for protecting the user's privacy. In contrast, the exposure module 510 can determine the exposure level 312 to represent "some exposure" or "complete exposure" if the personal location 224 is detected outside of the home geofence 206.

Continuing with the example, the exposure module 510 can determine the exposure level 312 based on the relationship level 308 meeting or exceeding the relationship threshold 310 between the user and the other user. For example, if the relationship level 308 represents "husband and wife," the exposure module 510 can determine the exposure level 312 to represent "complete exposure" of the personal location 224 even if the personal location 224 is within the home geofence 206. In contrast, if the relationship level 308 represents "stranger," the exposure module 510 can determine the exposure level 312 to represent "no exposure" of the personal location 224 even if the personal location 224 is outside of the home geofence 206.

It has been discovered that the navigation system 100 determining the exposure level 312 based on the relationship level 308 meeting or exceeding the relationship threshold 310 between the users improves the privacy and safety of the user. By controlling the exposure level 312 of the user location 220 based on the relationship level 308, the navigation system 100 can reduce the risk of exposing the user location 220 to the other user unnecessarily. As a result, the navigation system 100 can improve the safety and the privacy of the user operating the first device 102, the navigation system 100, or a combination thereof.

For a different example, the exposure module 510 can determine the exposure level 312 based on the zoom level 314. The zoom level 314 can range from 0% to 400% zoom where the 0% zoom is no zoom and 400% zoom can represent maximum zoom. More specifically as an example, if the personal location 224 is within the home geofence 206, the exposure module 510 can limit the exposure level 312 to the protection radius 318 of FIG. 3 even if the zoom level 314 is at a maximum zoom. As an example, the protection radius 318 can represent 0.5 mile. The zoom level 314 is at a maximum zoom. The exposure module 510 can prohibit the exposure of the precise location of the personal location 224 on the map within the protection radius 318 to protect the user's privacy.

In contrast, if the personal location 224 is outside of the home geofence 206, the exposure module 510 can determine the exposure level 312 to expose the precise location of the personal location 224. More specifically as an example, if the personal location 224 is within the POI geofence 208 and the zoom level 314 is at a maximum, the exposure module 510 can determine the exposure to represent "complete exposure" to expose the precise location of the personal location 224.

For further example, if the relationship level 308 between the user and the other user represents "stranger," the exposure module 510 can control the degree of the exposure level 312 as the zoom level 314 on the first device 102 of the other user increases. More specifically as an example, as the other user increases the zoom level 314 on the first device 102, the exposure module 510 can decrease the exposure level 312 to protect the user's privacy. As an example, if the zoom level 314 is at the maximum, the exposure module 510 can prohibit the exposure of the personal location 224 by eliminating the personal location 224 to be displayed on the first device 102 of the other user. Moreover, the exposure module 510 can control the exposure of the personal location 224 by not disclosing the precise location but disclosing the protection radius 318 instead of the personal location 224.

It has been discovered that the navigation system 100 determining the exposure level 312 based on the zoom level 314 improves the privacy and safety of the user. By controlling the exposure level 312 of the user location 220 by disclosing the protection radius 318 instead, the navigation system 100 can reduce the risk of exposing the user location 220 to the other user unnecessarily. As a result, the navigation system 100 can improve the safety and the privacy of the user operating the first device 102, the navigation system 100, or a combination thereof.

For a different example, the exposure module 510 can control the exposure level 312 based on the user entry 324 of FIG. 3. The user entry 324 can represent manual input, oral command, gesture, or a combination thereof. For example, the first device 102 can display a switch or a slide bar to control the exposure level 312 of the user location 220. More specifically as an example, the user can slide the switch or the slide bar to control the exposure module 510 to expose or not expose the user location 220.

For a different example, the user can press the button to control the exposure module 510 to expose or not expose the user location 220. The user can control the exposure level 312 similarly by making an oral command to the exposure module 510. The user can also control the exposure level 312 by performing the gesture to trigger the exposure module 510 to expose or not expose the user location 220. The exposure module 510 can communicate the exposure level 312 to a display module 512.

The navigation system 100 can include the display module 512, which can couple to the exposure module 510. The display module 512 displays the user location 220, the event 228, the geofence 202, or a combination thereof. For example, the display module 512 can display the user location 220, the event 228, the geofence 202, or a combination thereof for display on the map of the geographic area.

The display module 512 can display in a number of ways. For example, as discussed above, the display module 512 can control the display of the user location 220 based on the exposure level 312. Furthermore, the display module 512 can control the display of the event 228 based on the factors discussed above as certain condition(s) can factor the generation of the event 228. For further example, the display module 512 can display the event 228 for the duration specified by the event duration 232. For another example, the display module 512 can display the geofence 202, such as the user geofence 210, based on the detection of the user location 220 in a specific geographic area. The display module 512 can communicate the event 228, the user location 220, or a combination thereof to a status module 514.

The navigation system 100 can include the status module 514, which can couple to the display module 512. The status module 514 determines the event status 230 of FIG. 2. For example, the status module 514 can determine the event status 230 as terminated based on the user location 220, the event duration 232, or a combination thereof.

The status module 514 can determine the event status 230 in a number of ways. For example, the status module 514 can determine the event status 230 as terminated based on the user count 242 below the count threshold 244. More specifically as an example, if the user count 242 at the event 228 is detected to be less than the count threshold 244, the status module 514 can terminate the event 228. The status module 514 can communicate the event status 230 to the display module 512, an aggregator module 516, or a combination thereof.

For illustrative purposes, the navigation system 100 is described with the display module 512 controlling the display of the event 228, although it is understood that the display module 512 can operate differently. For example, the display module 512 can eliminate the event 228 from being displayed based on the event status 230 of terminated.

The navigation system 100 can include the aggregator module 516, which can couple to the status module 514. The aggregator module 516 aggregates the content 316 of FIG. 3. For example, the aggregator module 516 can aggregate a multiple instances of the content 316 based on the event 228, the user location 220, the relationship level 308, the geofence 202, or a combination thereof.

The aggregator module 516 can aggregate a multiple instances of the content 316 in a number of ways. For example, the content 316 can represent a digital photograph, a video, or a combination thereof taken at the event 228. The aggregator module 516 can aggregate the multiple instances of the content 316 to be shared amongst the participants at the event 228.

For a specific example, the aggregator module 516 can aggregate the multiple instances of the content 316 based on the event status 230, the user location 220, the relationship level 308, the geofence 202, or a combination thereof. More specifically as an example, if the event status 230 represents terminated, the aggregator module 516 can aggregate the multiple instances of the content 316 from the user, the other user, or a combination thereof that participated the event 228. Furthermore, the aggregator module 516 can share the multiple instances of the content 316 to the participants based on the relationship level 308 amongst the participants. More specifically as an example, the aggregator module 516 can share the multiple instances of the content 316 to the participants sharing the relationship level 308 of "friend" but not sharing the content 316 to the participants sharing the relationship level 308 of "acquaintance."

The physical transformation from traveling in and out of the geofence 202 results in the movement in the physical world, such as people using the first device 102, the vehicle, or a combination thereof, based on the operation of the navigation system 100. As the movement in the physical world occurs, the movement itself creates additional information that is converted back into generating the event 228, the notification 320, determining the exposure level 312, the event status 230, or a combination thereof for the continued operation of the navigation system 100 and to continue the movement in the physical world.

The first software 426 of FIG. 4 of the first device 102 of FIG. 4 can include the modules for the navigation system 100. The first software 426 can include the boundary module 502, the location module 504, the event module 506, the notification module 508, the exposure module 510, the display module 512, the status module 514, and the aggregator module 516.

The first control unit 412 of FIG. 4 can execute the first software 426 for executing the boundary module 502 to generate the geofence 202. The first control unit 412 can execute the first software 426 for executing the location module 504 to determine the user location 220. The first control unit 412 can execute the first software 426 for executing the event module 506 to generate the event 228.

The first control unit 412 can execute the first software 426 for executing the notification module 508 to generate the notification 320. The first control unit 412 can execute the first software 426 for executing the exposure module 510 to determine the exposure level 312. The first control unit 412 can execute the first software 426 for executing the display module 512 to display the location type 214, the event 228, the geofence 202, or a combination thereof.

The first control unit 412 can execute the first software 426 for executing the status module 514 to determine the event status 230. The first control unit 412 can execute the first software 426 for executing the aggregator module 516 to aggregate the content 316.

The second software 442 of FIG. 4 of the second device 106 of FIG. 4 can include the modules for the navigation system 100. For example, the second software 442 can include the boundary module 502, the location module 504, the event module 506, the notification module 508, the exposure module 510, the display module 512, the status module 514, and the aggregator module 516.

The second control unit 434 of FIG. 4 can execute the second software 442 for executing the boundary module 502 to generate the geofence 202. The second control unit 434 can execute the second software 442 for executing the location module 504 to determine the user location 220. The second control unit 434 can execute the second software 442 for executing the event module 506 to generate the event 228.

The second control unit 434 can execute the second software 442 for executing the notification module 508 to generate the notification 320. The second control unit 434 can execute the second software 442 for executing the exposure module 510 to determine the exposure level 312. The second control unit 434 can execute the second software 442 for executing the display module 512 to display the location type 214, the event 228, the geofence 202, or a combination thereof.

The second control unit 434 can execute the second software 442 for executing the status module 514 to determine the event status 230. The second control unit 434 can execute the second software 442 for executing the aggregator module 516 to aggregate the content 316.

The modules of the navigation system 100 can be partitioned between the first software 426 and the second software 442. The second software 442 can include the boundary module 502, the location module 504, the event module 506, the notification module 508, the exposure module 510, the status module 514, and the aggregator module 516.

The first software 426 can include the display module 512. Based on the size of the first storage unit 414, the first software 426 can include additional modules of the navigation system 100. The first control unit 412 can execute the modules partitioned on the first software 426 as previously described.

The first control unit 412 can operate the first communication unit 416 of FIG. 4 to communicate the event 228, the notification 320, the geofence 202, the location type 214, the exposure level 312, the event status 230, or a combination thereof to or from the second device 106. The first control unit 412 can operate the first software 426 to operate the location unit 420. The second control unit 434 can operate the second communication unit 436 of FIG. 4 to communicate the event 228, the notification 320, the geofence 202, the location type 214, the exposure level 312, the event status 230, or a combination thereof to or from the first device 102 through the communication path 104 of FIG. 4.

The first control unit 412 can operate the first user interface 418 of FIG. 4 to present the digital representation of the event 228, the notification 320, the geofence 202, the location type 214, the exposure level 312, the event status 230, or a combination thereof. The second control unit 434 can operate the second user interface 438 of FIG. 4 to present the digital representation of the event 228, the notification 320, the geofence 202, the location type 214, the exposure level 312, the event status 230, or a combination thereof.

The navigation system 100 describes the module functions or order as an example. The modules can be partitioned differently. For example, the location module 504 and the exposure module 510 can be combined. Each of the modules can operate individually and independently of the other modules. Furthermore, data generated in one module can be used by another module without being directly coupled to each other. For example, the event module 506 can receive the geofence 202 from the boundary module 502. Further, "communicating" can represent sending, receiving, or a combination thereof the data generated to or from one to another.

The modules described in this application can be hardware implementation or hardware accelerators in the first control unit 412 or in the second control unit 434. The modules can also be hardware implementation or hardware accelerators within the first device 102 or the second device 106 but outside of the first control unit 412 or the second control unit 434, respectively.

The modules described in this application can be implemented as instructions stored on a non-transitory computer readable medium to be executed by the first control unit 412, the second control unit 434, or a combination thereof. The non-transitory computer medium can include the first storage unit 414 of FIG. 4, the second storage unit 446 of FIG. 4, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 6:
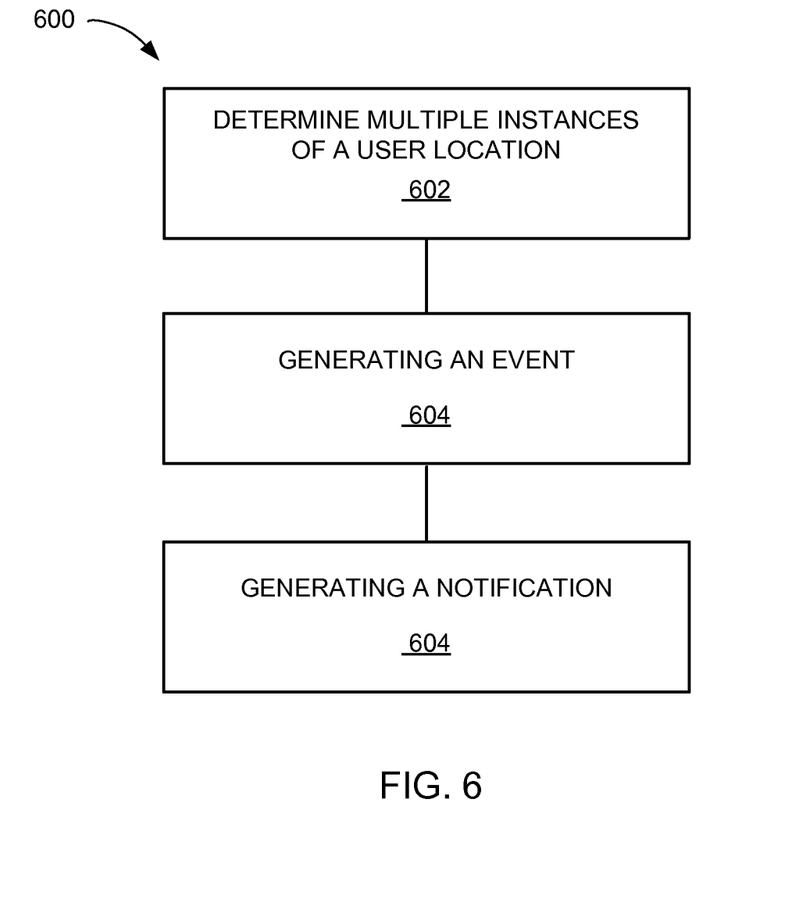
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: determining a multiple instances of a user location within a geofence in a block 602; generating an event with a control unit based on a user count of the user location meeting or exceeding a count threshold in a block 604; and generating a notification based on the event for displaying on a device in a block 606.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   determining multiple instances of a user location within a plurality of a geofence;
   determining multiple instances of an exposure level of the user location for each of the plurality of the geofence different from one another;
   limiting the exposure level of the user location within a home geofence;
   generating an event with a control unit including a processor based on a user count of the user location meeting or exceeding a count threshold; and
   generating a notification based on the event for displaying the user location on a device with each of the exposure level.

2. The method as claimed in claim 1 wherein generating the event includes generating the event based on a user distance between a personal location and an other's location is within a distance threshold.

3. The method as claimed in claim 1 wherein generating the event includes generating the event based on a relationship level meeting or exceeding a relationship threshold.

4. The method as claimed in claim 1 further comprising limiting the exposure level to a protection radius for protecting the user location from being located.

5. The method as claimed in claim 1 further comprising determining the exposure level based on a zoom level for limiting the exposure level of the user location.

6. The method as claimed in claim 1 further comprising determining an event popularity based on the user count meeting or exceeding the count threshold for notifying the event.

7. The method as claimed in claim 1 further comprising terminating the event based on the user count less than the count threshold for eliminating the event from being displayed.

8. The method as claimed in claim 1 further comprising aggregating multiple instances of a content based on an event status as being terminated for sharing the content to multiple instances of the device.

9. The method as claimed in claim 1 further comprising aggregating multiple instances of a content captured at the event for sharing the content to multiple instances of the device.

10. A navigation system comprising:
    a control unit including a processor for:
        determining multiple instances of a user location within a plurality of a geofence;
        determining multiple instances of an exposure level of the user location for each of the plurality of the geofence different from one another;
        limiting the exposure level of the user location within a home geofence,
    generating an event based on a user count of the user location meeting or exceeding a count threshold,
        generating a notification based on the event, and
    a communication unit including a microelectronic, coupled to the control unit, for communicating the notification for displaying the user location on a device with each of the exposure level.

11. The system as claimed in claim 10 wherein the control unit is generating the event based on a user distance between a personal location and an other's location is within a distance threshold.

12. The system as claimed in claim 10 wherein the control unit is generating the event based on a relationship level meeting or exceeding a relationship threshold.

13. The system as claimed in claim 10 wherein the control unit is limiting the exposure level to a protection radius for protecting the user location from being located.

14. A non-transitory computer readable medium including instructions for execution, the instructions executed by a control unit including a processor, comprising:
    determining multiple instances of a user location within a plurality of a geofence;
        determining multiple instances of an exposure level of the user location for each of the plurality of the geofence different from one another;
        limiting the exposure level of the user location within a home geofence;
        generating an event based on a user count of the user location meeting or exceeding a count threshold; and
        generating a notification based on the event for displaying the user location on a device with each of the exposure level.

15. The non-transitory computer readable medium as claimed in claim 14 further comprising generating the event based on a user distance between a personal location and an other's location is within a distance threshold.

16. The non-transitory computer readable medium as claimed in claim 14 further comprising generating the event based on a relationship level meeting or exceeding a relationship threshold.

17. The non-transitory computer readable medium as claimed in claim 14 further comprising limiting the exposure level to a protection radius for protecting the user location from being located.

* * * * *